United States Patent
Kracum et al.

(10) Patent No.: US 11,441,778 B2
(45) Date of Patent: Sep. 13, 2022

(54) ARTICLE WITH COOLING HOLES AND METHOD OF FORMING THE SAME

(71) Applicant: UNITED TECHNOLOGIES CORPORATION, Farmington, CT (US)

(72) Inventors: Michael R. Kracum, Manchester, CT (US); David C. Jarmon, Hendersonville, NC (US)

(73) Assignee: Raytheon Technologies Corporation, Farmington, CT (US)

( * ) Notice: Subject to any disclaimer, the term of this patent is extended or adjusted under 35 U.S.C. 154(b) by 232 days.

(21) Appl. No.: 16/723,404

(22) Filed: Dec. 20, 2019

(65) Prior Publication Data

US 2021/0190318 A1 Jun. 24, 2021

(51) Int. Cl.
| | |
|---|---|
| C04B 35/626 | (2006.01) |
| F23R 3/00 | (2006.01) |
| C04B 35/80 | (2006.01) |
| C04B 38/06 | (2006.01) |
| F02C 7/18 | (2006.01) |

(52) U.S. Cl.
CPC ............ *F23R 3/005* (2013.01); *C04B 35/626* (2013.01); *C04B 35/80* (2013.01); *C04B 38/06* (2013.01); *F02C 7/18* (2013.01); *F05D 2230/21* (2013.01); *F05D 2260/202* (2013.01); *F23R 2900/00018* (2013.01); *F23R 2900/03042* (2013.01)

(58) Field of Classification Search
CPC ....... C04B 35/626; C04B 35/80; C04B 38/06; C04B 38/0645; C04B 2235/5256; F05D 2260/201; F05D 2300/20
See application file for complete search history.

(56) References Cited

U.S. PATENT DOCUMENTS

| | | | | |
|---|---|---|---|---|
| 4,040,770 A | * | 8/1977 | Carlson | F01D 5/282 |
| | | | | 416/230 |
| 4,684,322 A | * | 8/1987 | Clifford | F01D 5/187 |
| | | | | 415/175 |
| 5,573,377 A | * | 11/1996 | Bond | F01D 5/147 |
| | | | | 416/219 R |
| 6,627,019 B2 | | 9/2003 | Jarmon et al. | |
| 7,785,071 B1 | | 8/2010 | Liang | |
| 7,824,156 B2 | * | 11/2010 | Dellmann | F23M 5/085 |
| | | | | 416/96 R |
| 9,802,869 B2 | * | 10/2017 | Podgorski | F01D 5/187 |

(Continued)

FOREIGN PATENT DOCUMENTS

| | | | | |
|---|---|---|---|---|
| EP | 1215183 | 6/2002 | | |
| WO | WO-2017058787 A1 | * | 4/2017 | ........... C08G 59/687 |

OTHER PUBLICATIONS

The Extended European Search Report for European Patent Application No. 20213163.7 dated May 18, 2021.

*Primary Examiner* — Noah S Wiese
(74) *Attorney, Agent, or Firm* — Carlson, Gaskey & Olds, P.C.

(57) ABSTRACT

A method of making an ceramic article according to an exemplary embodiment of this disclosure, among other possible things includes arranging fiber plies into a preform, inserting one or more sacrificial springs to the preform, infiltrating the preform with a matrix material to form an article, and thermally degrading the one or more sacrificial springs to form cooling holes. A ceramic article and a gas turbine engine component are also disclosed.

20 Claims, 6 Drawing Sheets

(56) References Cited

U.S. PATENT DOCUMENTS

| | | |
|---|---|---|
| 10,011,043 B2 | 7/2018 | Gray et al. |
| 10,017,425 B2 | 7/2018 | Tuertscher et al. |
| 2013/0017094 A1 | 1/2013 | Coupe et al. |
| 2014/0161626 A1* | 6/2014 | Podgorski ............... F01D 5/282 |
| | | 416/96 R |
| 2018/0251407 A1* | 9/2018 | Watkins .................. C08L 63/00 |
| 2019/0071363 A1 | 3/2019 | Li et al. |
| 2020/0010375 A1 | 1/2020 | Tang et al. |
| 2020/0062664 A1 | 2/2020 | Tang et al. |

* cited by examiner

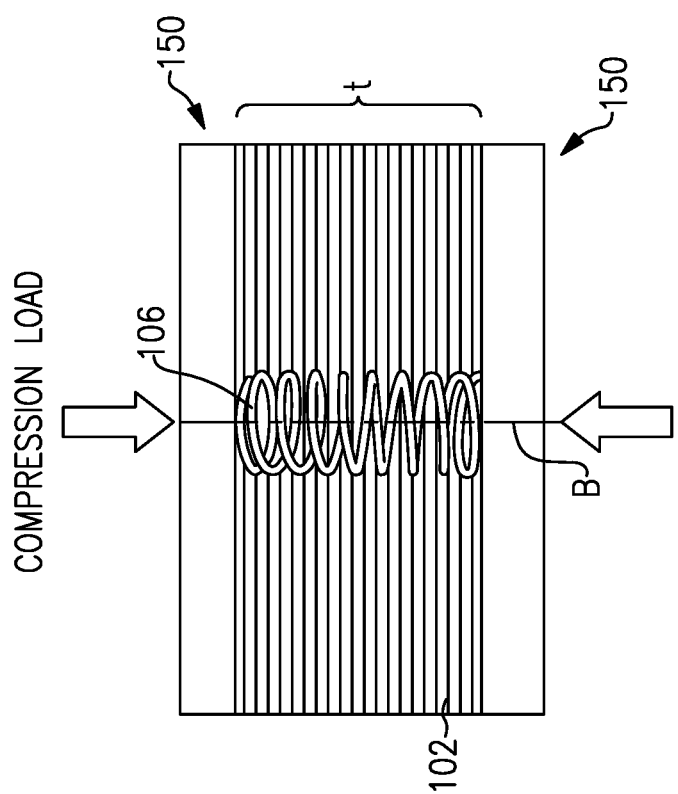
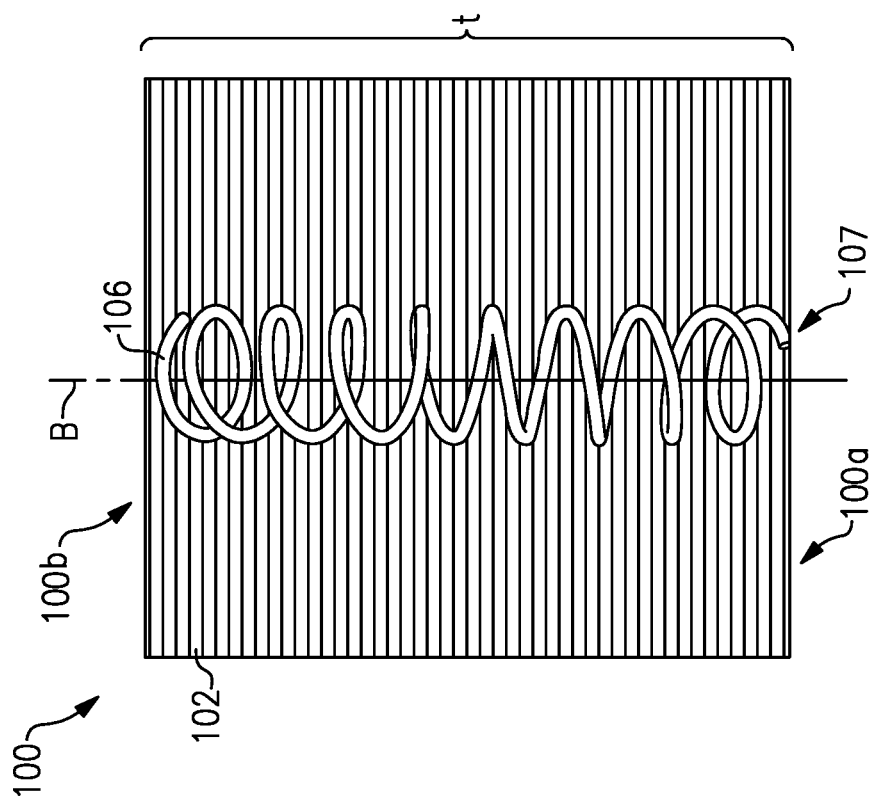

ARTICLE WITH COOLING HOLES AND METHOD OF FORMING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures. One way to provide cooling to components subjected to high temperatures is to provide cooling holes in the component that are configured to receive cooling air. However, forming cooling holes in ceramic components presents certain challenges.

SUMMARY

A method of making an ceramic article according to an exemplary embodiment of this disclosure, among other possible things includes arranging fiber plies into a preform, inserting one or more sacrificial springs to the preform, infiltrating the preform with a matrix material to form an article, and thermally degrading the one or more sacrificial springs to form cooling holes.

In a further example of the foregoing, the one or more sacrificial springs comprise graphite fibers in an epoxy matrix.

In a further example of any of the foregoing, the one or more sacrificial springs comprise graphite fibers in an epoxy matrix.

In a further example of any of the foregoing, the epoxy matrix has a carbon yield of between about 30-50 wt. % upon thermal degradation.

In a further example of any of the foregoing, the one or more sacrificial springs are inserted by being screwed into the preform.

In a further example of any of the foregoing, the one or more sacrificial springs are inserted such that an axis of the one or more sacrificial springs is perpendicular to a plane of the fiber plies.

In a further example of any of the foregoing, the one or more sacrificial springs displace fibers in the plies during insertion.

In a further example of any of the foregoing, the one or more sacrificial springs are inserted through and entire thickness of the preform such that the one or more sacrificial springs meet or extend through opposed faces of the preform.

In a further example of any of the foregoing, the infiltrating is by chemical vapor infiltration.

In a further example of any of the foregoing, non-carbon elements of the one or more sacrificial springs vaporize during the infiltration.

In a further example of any of the foregoing, the method further includes providing a sacrificial sheet in the preform prior to inserting the one or more sacrificial springs into the preform, and thermally degrading the sacrificial sheet after the infiltration to form a gap.

In a further example of any of the foregoing, the step of thermally degrading the sacrificial sheet is simultaneous with the step of thermally degrading the sacrificial sheet.

In a further example of any of the foregoing, the method further includes compressing the preform prior to the infiltration.

In a further example of any of the foregoing, a fiber content of the preform before compressing is between about 5-20 vol. % and the fiber content of the preform after the compressing is between about 20-50 vol. %.

In a further example of any of the foregoing, the method further includes inserting carbon inserts into the cooling holes at a face of the article, applying a coating to the face, and thermally degrading the carbon inserts.

In a further example of any of the foregoing, the method further includes forming the one or more sacrificial springs by pultrusion.

A ceramic article according to an exemplary embodiment of this disclosure, among other possible things includes a plurality of fibers arranged in fiber plies, a matrix material surrounding the fiber plies, and one or more helical cooling holes extending through the article, wherein the fibers in the fiber plies are displaced by the one or more cooling holes and are continuous local to the one or more cooling holes.

In a further example of any of the foregoing, the one or more helical cooling holes includes an array of helical cooling holes.

In a further example of any of the foregoing, the one or more helical cooling holes extend along an axis, and the axis is perpendicular to a plan of the fiber plies.

In a further example of any of the foregoing, the helical cooling holes open to opposed faces of the article.

A gas turbine engine component according to an exemplary embodiment of this disclosure, among other possible things includes a plurality of fibers arranged in fiber plies, a matrix material surrounding the fiber plies, and one or more helical cooling holes extending through the article, wherein the fibers in the fiber plies are displaced by the one or more cooling holes and are continuous local to the one or more cooling holes.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIGS. 2A-B illustrates an example article with cooling holes being formed therein.

DETAILED DESCRIPTION

Figure 1:
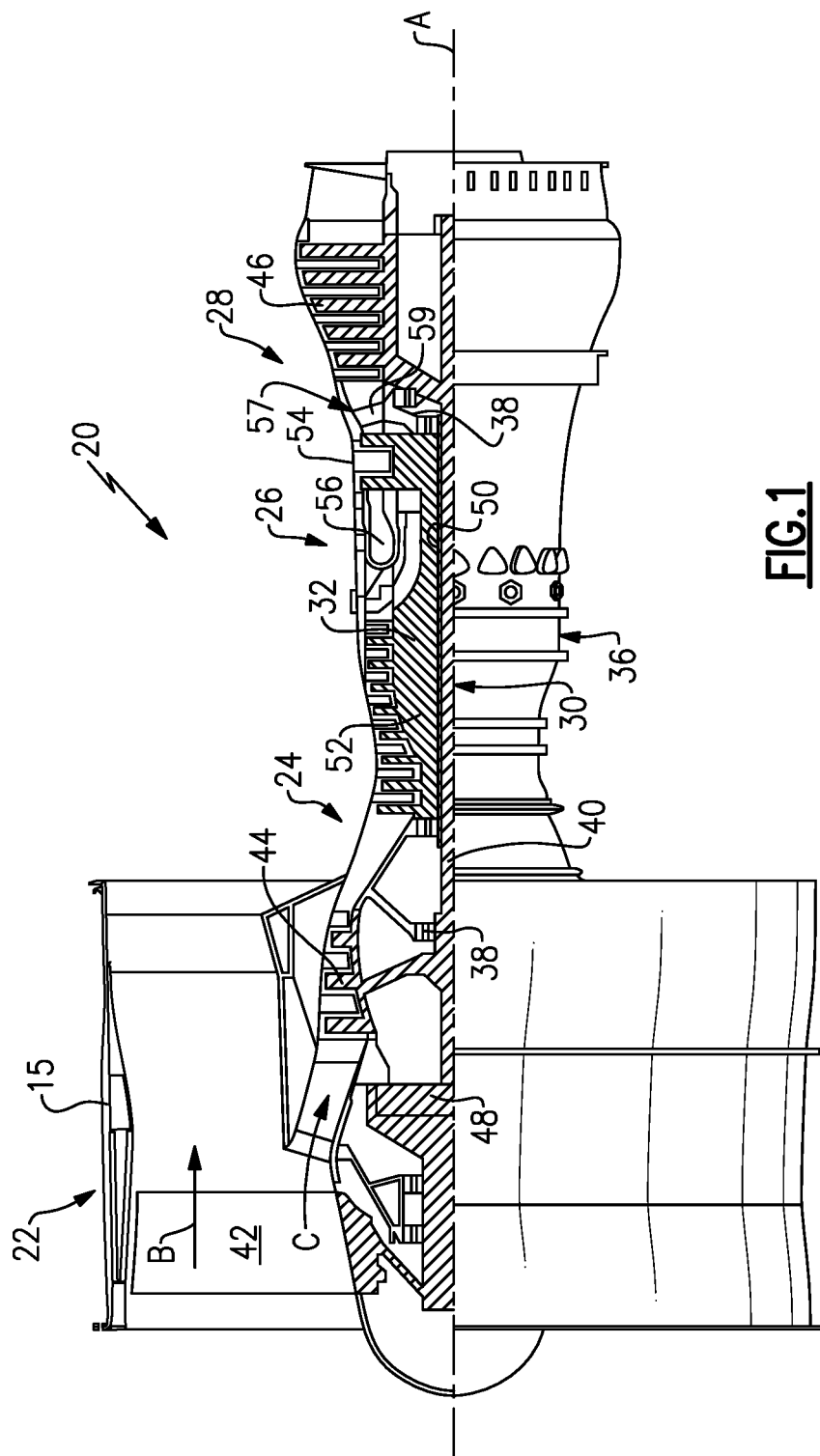
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors in the low pressure turbine 46 and the number of blades in the fan section 22 disclose an example gas turbine engine 20 with increased power transfer efficiency.

Figure 3:
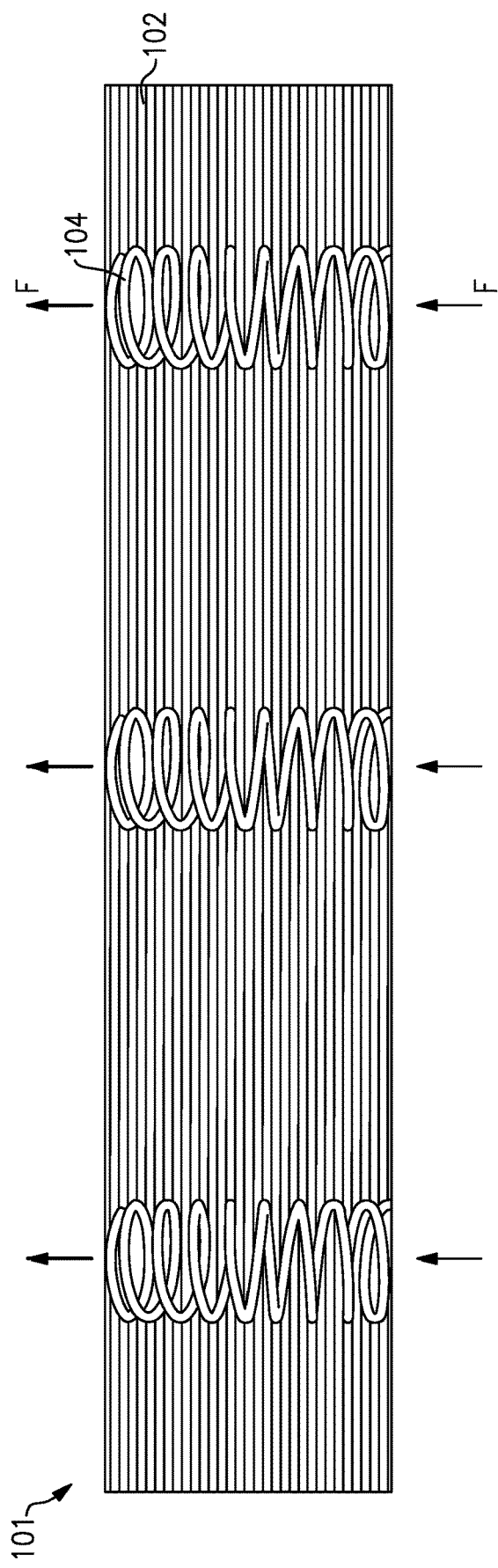
FIG. 3 illustrates an example article with cooling holes formed therein.

FIGS. 2A-B schematically illustrates a preform 100 (FIG. 2) for an article 101 (FIG. 3). In one particular example, the article 101 is a liner for the combustor 56 of the engine 20, though any other gas turbine engine 20 components are contemplated. The article 101 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies 102 that are arranged in a stacked configuration and formed to the desired geometry of the article 101. The plies 102 can include woven fibers or tapes of fibers, or fibers arranged in any other known configuration. The plies 102 or tows can be two-dimensional or three-dimensional.

As shown in FIG. 3, the article 101 includes helical cooling holes 104. The helical cooling holes 104 are configured to receive cooling air flow F in order to provide cooling to the article 101. The helical cooling holes 104 provide a tortuous, e.g., non-straight, path for the cooling air flow F, which facilitates improved heat transfer between the cooling air flow F and the article 101 as compared to a cooling hole with a straight path. Additionally, the tortious path is longer than a straight path, providing more surface area for heat transfer, and ultimately improving heat transfer between the cooling air flow F and the article 101 as compared to a straight cooling hole.

Figure 4:
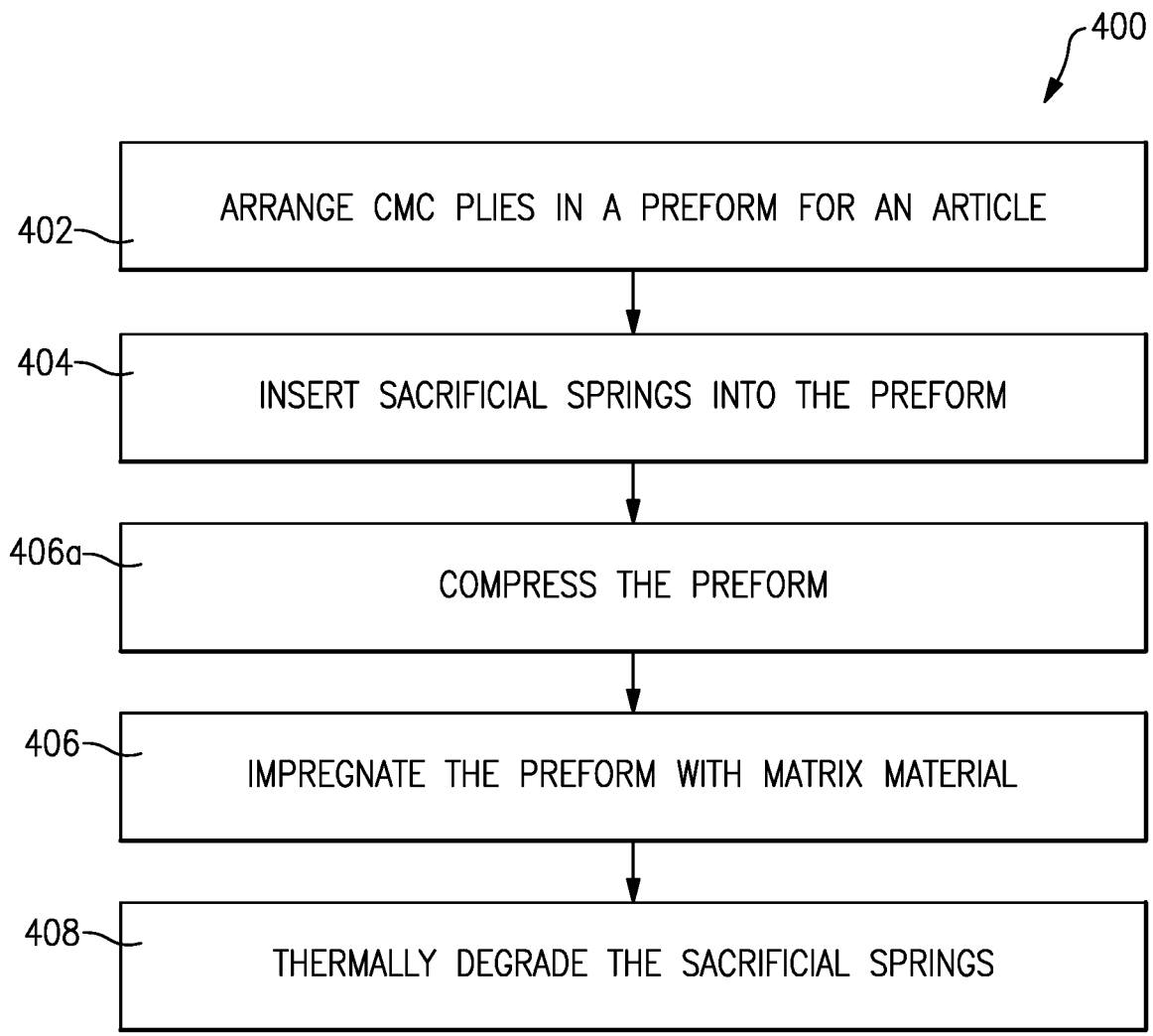
FIG. 4 illustrates a method of forming cooling holes in an example article.

FIG. 4 shows a method 400 of forming helical cooling holes 104 in the article 101. In step 402, fiber plies 102 are arranged in a preform 100, shown in FIG. 2A, according to any known method, as discussed above. For example, the preform 100 may have a geometry that corresponds to a desired geometry for the article 101. In some examples, an interface coating is applied to the fiber plies 102 prior to or after forming the preform 100. The interface coating can be any known interface coating and can be applied in any known way, such as by chemical vapor infiltration (CVI) or atomic layer deposition (ALD).

In step 404, one or more sacrificial spring 106 are inserted into the preform 100 by being screwed into the preform 100. The sacrificial springs 106 are inserted so that they extend through the entire thickness t of the preform 100, e.g., so that ends 107 of the sacrificial springs 106 meet or extend through opposed faces 100a/100b of the preform 100. Therefore, the resulting cooling holes 104 open to the opposed faced 100a/100b. In a particular example, the sacrificial springs 106 extend along an axis B that is generally perpendicular to a plane of the plies 102.

The sacrificial springs 106 can be inserted into the preform 100 in any arrangement or array, which corresponds to the desired array of cooling holes 104 in the article 101. For example, the desired array of cooling holes 104 may include rows/columns of cooling holes 104 or may have a staggered arrangement. The sacrificial springs 106 are formed from a material that can be thermally degraded without degradation of the preform 100. For example, the sacrificial springs 106 can be formed from a composite including graphite fibers in an epoxy matrix. In one example, the graphite fibers are bundled into tows. In a further example, the tows are twisted tows. The twisting can facilitate handling/forming the sacrificial spring 106 (discussed in detail below). In one example, the graphite fibers can make up between about 50 and 70 vol. % of the sacrificial springs 106. In one example, the epoxy has a high carbon yield upon thermal degradation. In a particular example, the epoxy has a carbon yield of between about 30-50 wt. % upon thermal degradation.

In some examples, the sacrificial springs 106 have a rough/non-smooth surface. For instance, the rough surface can be due to the twisting of the graphite fibers, which creates spiraling troughs at the surface of the sacrificial springs 106. Since the helical cooling holes 104 in the article 100 take the shape of the sacrificial springs 106, in examples where the sacrificial springs 106 have rough surfaces, the resulting cooling holes 104 have rough surfaces, too. These rough surfaces can serve to turbulate or disrupt cooling air flow F as it passes through the cooling holes 104, which can improve cooling efficiency.

In some examples, the sacrificial springs 106 have at least one sharpened end 107, which facilitates insertion of the sacrificial spring 106 into the preform 100. Because the tows or plies 102 in the preform 100 have not yet been infiltrated with a matrix material and the preform 100 has not been cured, individual fibers in the plies 102 can still move around within the plies. Therefore, during the insertion of the sacrificial springs 106, the sacrificial springs 106 displace, but generally do not break, individual fibers of the plies 102. Therefore, the fibers in the fiber plies 102 are displaced but continuous local to the resulting cooling holes 104.

The sacrificial springs 106 are made from a rod 108 that is formed into a spring (spiral or helical) shape. In some examples, the rod 108 has a diameter between about 0.38 and 1.02 mm (0.015 and 0.040 inches). The rod 108 can be formed by pultrusion. Pultrusion is a molding process which generally includes saturating the graphite fibers with liquid epoxy and then molding the saturated graphite fibers into a spring. In one example, the molding is accomplished by bonding the graphite fibers to a metal wire situated in a helical channel mold. The bonded graphite fiber is then soaked in epoxy, and drawn through the helical channel by pulling on the metal wire. The epoxy is then cured. In another example, a metal rod with a helical or spiral groove is used as a mold. In this example, epoxy-soaked graphite fibers are wound around the metal rod and placed in the groove, and then the epoxy is cured. In some examples, the rod 108 is simultaneously made and molded into the sacrificial spring 106. In a particular example, graphite fibers are wound onto the grooved metal rod and passed through a pultrusion rig as would be known in the art.

Turning again to FIG. 4, in step 406, the preform 100 is impregnated with a matrix material to form the CMC article 101. The impregnation can be by any know impregnation method. One non-limiting example method is chemical vapor infiltration (CVI). CVI generally includes heating the preform 100 in an inert environment. The heating can cause the epoxy in the sacrificial springs 106 to begin decomposing thermally, including vaporization of the non-carbon components. The carbon remains in between the graphite fibers and inhibits deposition of the matrix material in between the graphite fibers.

In some examples the method 400 incudes the optional step 406a prior to the step 406 in which the preform 100 is compressed in a tool 150. In these examples, compression is performed to increase the fiber volume loading in order to increase the mechanical performance of the resultant CMC. The compressing includes applying a compressive load parallel to the axis B of the sacrificial springs 106 to compress the sacrificial springs 106. In a particular example, the compressing can including compressing the preform 100 from a thickness t that is on the order of inches to a thickness t that is on the order of thousandths of an inch. In another particular example, the fiber content of the preform 100 is between about 5-20 vol. % and the fiber content of the preform 100 after compression is between about 20-50 vol. %. The preform 100 can be held under compression during the curing step 406, in some examples.

In step 408, the sacrificial springs 106 are thermally degraded (e.g., burned out) by heating the article to form the helical cooling holes 104. In some examples, such as the CVI example discussed above, the thermal degradation can begin during the impregnation step 406. In step 408, remnants of the sacrificial spring 106, such as carbon-containing elements which did not thermally decompose during the impregnation step 406, are burned out from the article 101. Step 408 is performed in an oxygen-containing requirement, in some examples, to facilitate burn off of the remaining carbon-containing elements.

Traditional methods of forming cooling holes in an article, such as drilling, stamping, punching, or other known methods are not well-suited for ceramic articles like the article 101. These methods are generally performed after fabrication of an article, requiring time consuming and expensive post-processing steps. In the case of the ceramic article 101, these methods would be performed after the article is impregnated with the matrix material, meaning the fibers are generally held in place. Therefore, the fibers are more likely to be broken rather than simply displaced during the insertion of the sacrificial springs 106 as discussed above.

In some examples, a coating 110 such as an environmental barrier coating can be applied to a face 100a of the article 100. Carbon inserts can be inserted into the openings of helical cooling holes 104 at a face 100a prior to applying the coating. The carbon inserts can then be thermally degraded as discussed above after the application of the coating 110.

Figure 5:
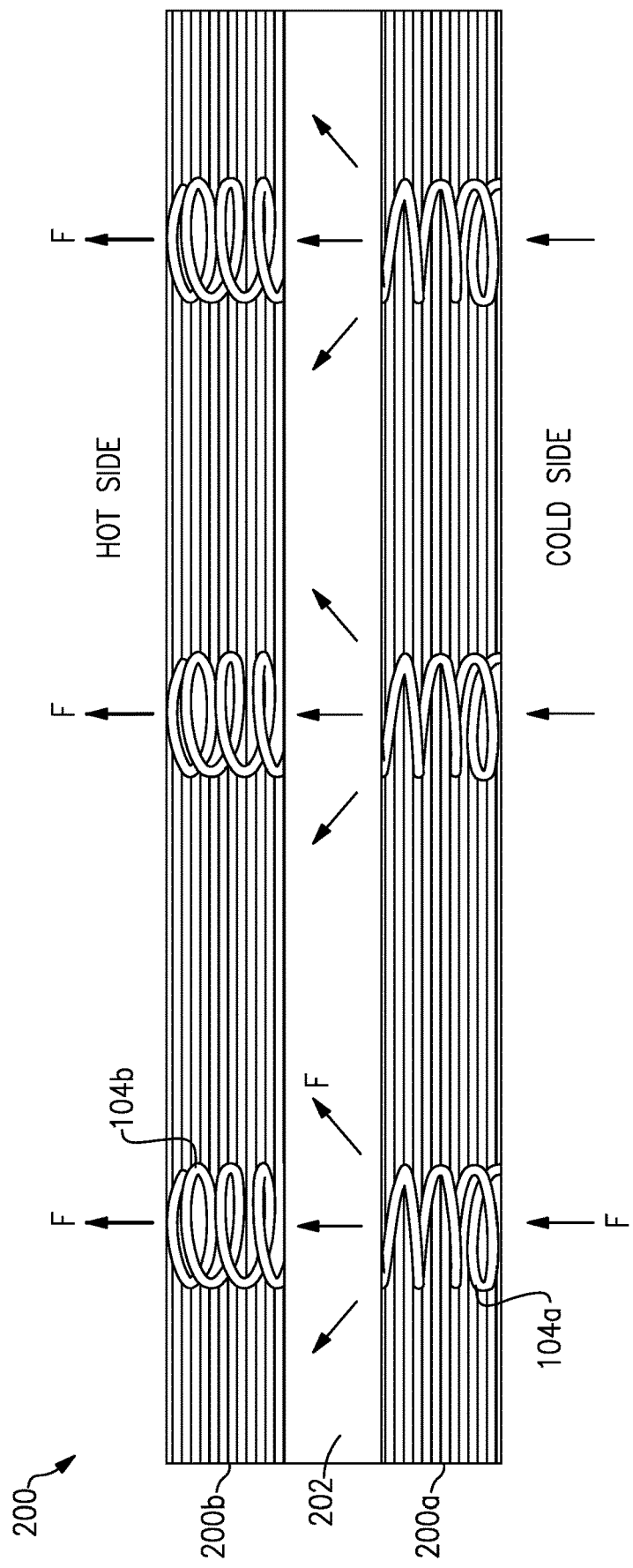
FIG. 5 shows another example article.

FIG. 5 shows another example article 200 which includes a gap 202 separating the article 200 into segments 200a/200b on either side of the gap 202. The gap 202 facilitates impingement cooling of the segment 200b, which may be exposed to hot gases in the engine 20, for example, by dividing the helical cooling holes 104 into two segments 104a/104b separated by the gap 202. Though the segments 104a/104b are axially aligned with one another in the example of FIG. 5, in other examples, they could be offset from one another. As cooling air F leaves the segment 104a of the helical cooling holes, it impinges against the segment 200b of the article 200 and travels into the segment 104b of the helical cooling holes. The impingement facilitates improved heat transfer between the cooing air F and the segment 200b.

The gap 202 can be formed by inserting a sacrificial sheet into the preform 100 prior to the step 404 of inserting the sacrificial springs 106 into the preform 100. Alternatively, the sacrificial sheet can be layed up with the fiber plies 102 during formation of the preform 100 as discussed above. The sacrificial springs 106 are then inserted into the preform 100 and through the sacrificial sheet. The sacrificial sheet is thermally decomposed like the sacrificial springs 106 discussed above. The sacrificial sheet can be made of similar material as the sacrificial springs 106 or another thermally decomposable carbon-based material.

Figure 6:
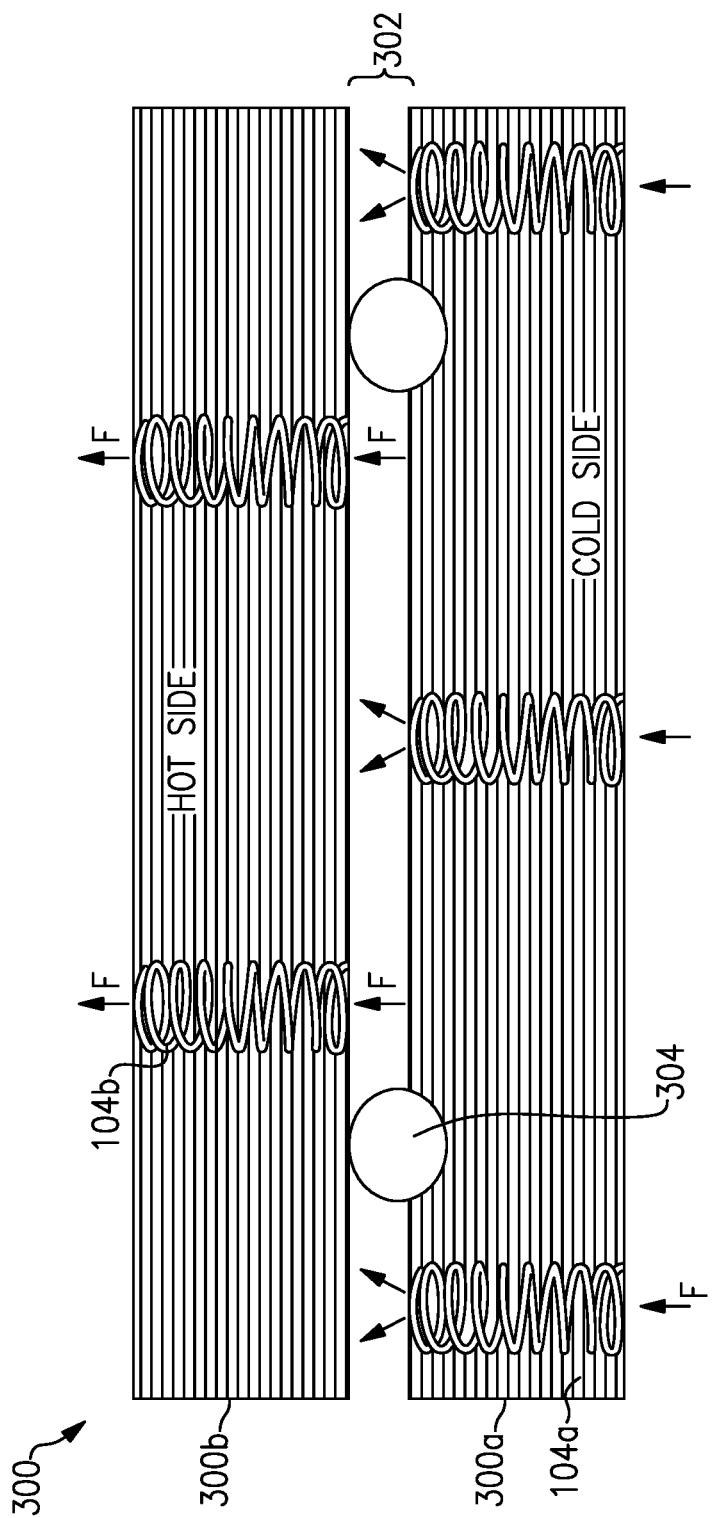
FIG. 6 shows another example article.

FIG. 6 shows another example article 300 which is similar to the article 200 and includes a gap 302 separating the article 300 into segments 300a/300b. The gap 302 also separates the helical cooling holes 104 into segments 104a/104b. In this example, ceramic spheres 304 are in the gap 302. The ceramic spheres 304 can be Si3N4 or SiC, in some examples, though other materials are contemplated. The ceramic spheres 304 maintain the gap 302 to maintain the improved cooling due to cooling air F impingement on the segment 300b, as discussed above.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of making a ceramic article, comprising:
    arranging fiber plies to form a preform;
    after forming the preform, inserting one or more sacrificial springs to the preform;
    infiltrating the preform with a matrix material to form an article; and
    thermally degrading the one or more sacrificial springs to form cooling holes.

2. The method of claim 1, wherein the one or more sacrificial springs comprise graphite fibers in an epoxy matrix.

3. The method of claim 2, wherein the epoxy matrix has a carbon yield of between about 30-50 wt. % upon thermal degradation.

4. The method of claim 1, wherein the one or more sacrificial springs are inserted by being screwed into the preform.

5. The method of claim 1, wherein the one or more sacrificial springs are inserted such that an axis of the one or more sacrificial springs is perpendicular to a plane of the fiber plies.

6. The method of claim 1, wherein the one or more sacrificial springs displace fibers in the plies during insertion.

7. The method of claim 1, wherein the one or more sacrificial springs are inserted through an entire thickness of the preform such that the one or more sacrificial springs meet or extend through opposed faces of the preform.

8. The method of claim 1, wherein the infiltrating is by chemical vapor infiltration.

9. The method of claim 8, wherein non-carbon elements of the one or more sacrificial springs vaporize during the infiltration.

10. The method of claim 1, further comprising providing a sacrificial sheet in the preform prior to inserting the one or more sacrificial springs into the preform, and thermally degrading the sacrificial sheet after the infiltration to form a gap.

11. The method of claim 10, wherein the step of thermally degrading the sacrificial sheet is simultaneous with the step of thermally degrading the sacrificial sheet.

12. The method of claim 1, further comprising compressing the preform prior to the infiltration.

13. The method of claim 12, wherein a fiber content of the preform before compressing is between about 5-20 vol. % and the fiber content of the preform after the compressing is between about 20-50 vol. %.

14. The method of claim 1, further comprising:
    inserting carbon inserts into the cooling holes at a face of the article;
    applying a coating to the face; and
    thermally degrading the carbon inserts.

15. The method of claim 1, further comprising forming the one or more sacrificial springs by pultrusion.

16. The method of claim 1, wherein prior to step of arranging the plies to form the preform, applying an interface coating to one or more of the plies.

17. The method of claim 1, wherein at least one of the one or more sacrificial springs include a sharpened end configured to facilitate insertion of the at least one sacrificial spring into the preform.

18. The method of claim 1, further comprising the step of forming the one or more sacrificial springs by:
    providing a rod; and
    forming the rod into a helical shape.

19. The method of claim 18, wherein the rod has a diameter between about 0.38 and 1.02 mm (0.015 and 0.040 inches).

20. The method of claim 10, wherein the sacrificial sheet is arranged with the fiber plies while forming the preform.

* * * * *